United States Patent [19]
Kreuzburg et al.

[11] 4,204,959
[45] May 27, 1980

[54] APPARATUS FOR THE TREATMENT AND COMPOSTING OF BIOLOGICAL WASTE

[75] Inventors: Eberhard Kreuzburg, Ratzeburg; Günter Eichholz; Knut Dederichs, both of Mölln, all of Fed. Rep. of Germany

[73] Assignee: Gesellschaft zur Errichtung von Unweltschutzanlagen mbH, Fed. Rep. of Germany

[21] Appl. No.: 898,159

[22] Filed: Apr. 20, 1978

[51] Int. Cl.² .................... C02C 1/14; C02C 1/40
[52] U.S. Cl. ................... 210/195.1; 71/9; 210/213; 210/216; 210/218; 210/256; 422/209; 422/229
[58] Field of Search .......... 23/259.1, 269 R, 269 V, 23/314; 71/9; 210/194, 195 R, 197, 209, 210, 213, 219, 256, 261, 322, 342, 216, 218; 422/209, 229

[56] References Cited

U.S. PATENT DOCUMENTS

| 614,135 | 11/1898 | Schmidt | 23/259.1 X |
| 696,506 | 4/1902 | Stanley | 210/218 |
| 2,146,692 | 2/1939 | Tiedman | 210/219 X |
| 2,656,257 | 10/1953 | Hohnadel | 23/314 X |
| 3,410,233 | 11/1968 | Seiler | 23/259.1 X |
| 3,561,943 | 2/1971 | Gay, Jr. et al. | 71/9 |
| 3,720,320 | 3/1973 | Fletcher | 210/210 X |
| 4,072,494 | 2/1978 | Gujer | 71/9 |

FOREIGN PATENT DOCUMENTS 324583 8/1920 Fed. Rep. of Germany ........ 23/269 R
9305 of 1907 United Kingdom ..................... 210/213

Primary Examiner—Robert H. Spitzer

[57] ABSTRACT

A first thermally insulated hollow cylinder is mounted for rotation about its longitudinal axis and a second hollow cylinder is mounted within the first cylinder for conjoint rotation therewith. The ends of the cylinders are closed to define a first annular chamber therebetween and a second chamber within the second cylinder. Inlet means for waste is provided communicating with the annular chamber adjacent one axial end thereof and a portion of said second cylinder adjacent the other axial end of said annular chamber is formed as a sieve permitting transfer of material from said annular chamber to the second chamber. Discharge means are provided communicating with the chamber within said second cylinder at the same axial end as the inlet, for the discharge of composted material.

19 Claims, 3 Drawing Figures

APPARATUS FOR THE TREATMENT AND COMPOSTING OF BIOLOGICAL WASTE

The invention relates to a device for dressing and rapidly decaying refuse of solid effluent material and sewage sediment or liquid effluent, for example which has been pretreated, which after mixed with a predetermined amount of moisture, are introduced at one end of a hollow cylinder which may be slightly inclined to the horizontal, the said hollow cylinder being mounted so as to be drivable about its axis and being insulted with regard to loss of heat.

As is known biological dressing of refuse plays an increasingly important part in treating refuse since, through this, pollution of the environment can be avoided or reduced and a large proportion of the refuse obtained can be utilized profitably.

In biological dressing of proportions of refuse, it is also known to moisten the refuse with sewage sediment or other liquid effluent materials in order to initiate decay and to improve the C, N, P ratio at the same time.

In order to achieve rapid decay under these conditions, it is known to mix the pretreated, i.e. crushed, sorted and otherwise treated refuse with sewage sediment or liquid effluent materials up to a moisture content of approximately 65% and to introduce the mixture into one end of an elongated drum which can be driven about a horizontal axis or about an axis which is slightly inclined to the horizontal. These drums can be 20–40 m or longer and can have a diameter of 3–5 m or more. The drum sleeve is insulated with regard to heat loss so that the heat formed during biological decay taking place in the drum can be kept in the drum so that the material takes on a temperature of between 70° and 80° C. without external heating. As a result, pathogenic nuclei in the refuse are largely killed and the decay process is accelerated. The material treated passes out at the other end of the known drum with a slightly reduced moisture content of 40–45% together with water vapour resulting from the heat. The material obtained from these drums must be stored for a few more days or weeks and must be recomposted before it can be used again, more particularly as a fertilizer. Storing this material for recomposting requires considerable storage volumes and increased expenditure on charging and emptying the storage places. Moreover, recomposting during storage depends to a large extent on the effects of and changes in the surrounding atmosphere.

The present invention seeks to take remedial measures and to further develop a device such as that referred to at the outset so that rapid decay can be hastened substantially more accurately and intensively without any substantial increased space requirement and effectively without any increased use of energy so that the material passing out of the device can be conveyed away for further utilization almost immediately without intermediate storage for several days or for weeks being necessary.

According to the invention there is provided a device for the dressing and rapid decay of refuse or solid effluent material and of sewage sediment or liquid effluent materials comprising a first hollow cylinder mounted horizontally or slightly inclined to the horizontal for rotary drive about its axis, the cylinder being insulated against loss of heat, a second hollow cylinder mounted within the first horizontal cylinder to provide an annular chamber therein and for movement therewith, a charging arrangement associated with one end of the first cylinder, a discharge arrangement associated with the second cylinder at the charging end of the first cylinder and a transfer device in a transfer region at the other ends of the cylinders for transferring material from the annular chamber of the first cylinder to the second cylinder.

Preferably the second cylinder has a diameter not more than half the diameter of the first cylinder.

With a diameter of 2 to 5 m of the first or outer cylinder a diameter of approximately 1 m has proved useful for the inner hollow cylinder. The second or inner cylinder may be fixed to the outer cylinder therefore additional mounting or drive devices are not necessary since the second cylinder rotates in the same way as the outer cylinder. The material recycled through the inner cylinder experiences subsequent decay in the inner cylinder.

For this subsequent decay, during which substantially smaller quantities of heat are usually produced, the material contained in the inner cylinder may be kept at a uniform and elevated temperature by the heat produced in the outer annular chamber. The material, which has decayed rapidly and been subsequently decayed and is thus ready for use, may be removed at the charging end without increasing the dimensions of the device and almost without any significant loss of heat.

Passing the rapidly decayed material once more through the length of the device in the opposite direction provides the advantage that certain portions of the subsequently decayed material from the inner chamber can be added to the rapid decay material travelling in the opposite direction in the annular chamber through controllable openings in the inner cylinder in order to control and accelerate decay in the annular chamber. Supplying biologically finished dressed material to the material which is still to be decayed in the annular chamber may thus take place particularly advantageously at the charging end of the device. As a result of adding the decayed material to the newly supplied material, the rapid decay process may be accelerated exceptionally well. The proportion of addition may be set accurately by appropriate slide valves for the control of overflow openings.

Loading of the device which has been increased by taking up the subsequent decay material in the inner cylinder may be compensated partially with respect to the necessary drive energy by subdividing the outer annular chamber into chamber parts divided in the peripheral direction by several partition walls and projecting inwardly from the outer cylinder and outwardly from the inner cylinder so that, when rotating the device, the material may only fall back constantly over a limited angle. As a result, distributing the material around the axis of rotation may be substantially homogenised and as a result of this the necessary drive force may be reduced.

It has proved to be particularly advisable if the annular chamber and the inner chamber can be ventilated or evacuated from outside separately and also if the opportunity is provided of introducing certain gases, for example oxygen or nitrogen alternately into the chambers.

The two cylinders may be arranged concentrically or eccentrically to each other since they are driven as one unit of motion about a common axis. The cross-sectional shape of the cylinder is not critical either.

The cylinders preferably comprise metal more particularly non-corroding sheet metal, whereby the outer cylinder may be heat-insulated by a thick cladding of aerated plastics, which is covered by an outer shell of plastics.

When charging the device, certain additional materials or materials reducing the moisture content may be added, such as sawdust, clarbon filler, straw, bark, methanol or lime etc., and/ or materials serving to set a desired pH value.

It is advisable if the material supplied is crushed in the annular chamber at the charging end in order to obtain the most uniform particle size possible which can be supervised by appropriate filtering taking place inside the annular chamber.

The invention will now be described in greater detail, by way of example, with reference to the schematic drawings in which.

Figures 1, 2, 3:
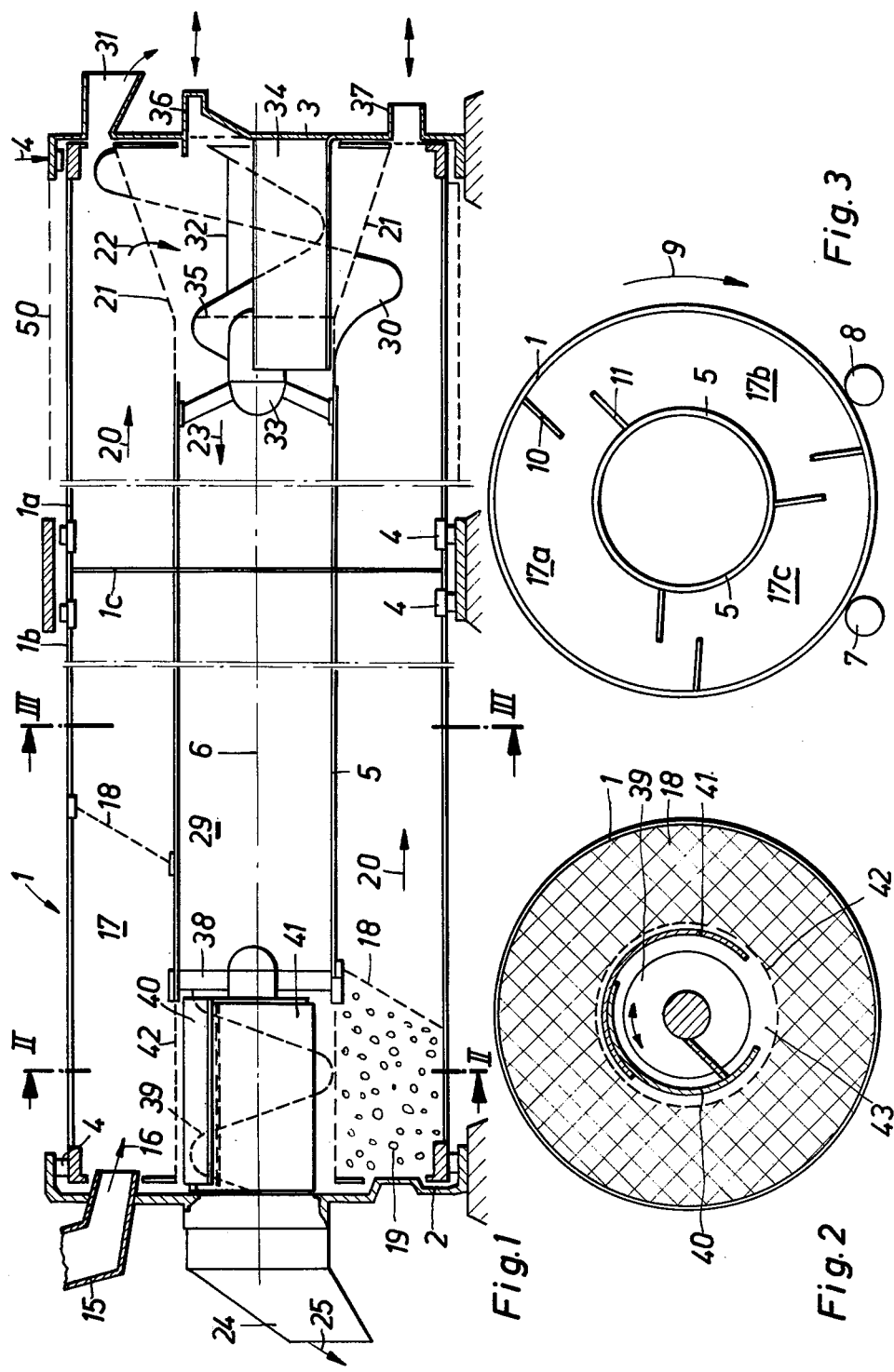
FIG. 1 shows the device as a portion in accordance with the invention in longitudinal section.
FIG. 2 shows a cross-section along the line II—II.
FIG. 3 shows a cross-section along the line III—III.

The device for dressing and rapid decay of pretreated refuse and sewage sediment has an elongated drum-shaped outer cylinder 1 which is manufactured from sheet metal, preferably non-corroding metal sheet e.g. stainless steel, and which can have any desired length. It is advisable if the outer cylinder comprises several portions of equal length as is shown in the middle of FIG. 1 at 1a and 1b. The portions are connected together at each joint 1c appropriately, for example, detachably by means of flanges or in fixed manner by means of welding. The outer cylinder has a strength which is sufficient to hold its own weight and is provided with ball-races for ring bearings 4 distributed along its length, these supporting the cylinder about the axis 6 so that it is rotatable. Two bearings 4 provided at the ends may be provided on the front discs 2 and 3 if these also rotate and serve as closure lids for the cylinder.

The drive of the cylinder 1 can take place via outer gear rims and bevel gears or by means of friction in that the cylinder with its outer sleeve is driven, for example, in the direction 9 of rotation by driven friction rollers 7 and 8 (compare FIG. 3). In a longitudinal direcfon, the cylinder can be guided for example through the fixed front discs 2 and 3. Further guide means, more particularly a guide via the ring bearings 4 can be provided.

Inside the outer cylinder 1 is arranged a second cylinder 5 while forming an annular chamber 17 and this second cylinder 5 is firmly supported in the outer cylinder 1 by devices (not shown) which connect the two chambers to form a rigid unit, which cylinders then rotate about a common axis 6. Thus it is not necessary for the inner cylinder 5 to be arranged at the centre of the outer cylinder 1. Rather, it can be arranged eccentrically and have a cross-section deviating from circular. While the outer cylinder 1 can be slightly downwardly inclined to the horizontal in preferred manner from the charging end to the other end, the inner cylinder 5 can be horizontally aligned in contrast thereto. The inner cylinder 5 limits an inner chamber 29 which is separated by the cylinder wall from the annular chamber 17.

The annular chamber 17 between the two cylinders 1 and 5 can be subdivided into several chamber parts 17a, 17b and 17c connected to each other in a circumferential direction, these chamber parts being connected together. For this purpose partition walls 10 and 11 can be provided, these projecting inwardly from the outer cylinder 1 and outwardly from the inner cylinder 5 respectively and extending for example parallel to the axis of rotation and being arranged in pairs and being offset with respect to each other in the circumferential direction within one pair, as FIG. 3 shows. As a result, when the unit is rotated the material located in the annular chamber, which is raised up by the rotating outer cylinder in each case, cannot fall back completely down to the lowest part of the annular chamber but remains on the partition walls 10 and 11 and is carried along so that the material located in the annular chamber is better distributed and more uniformly distributed over the circumference and fairly large imbalances, which make greater use of energy necessary, are avoided.

A charging hopper 15 for the material previously dressed is provided in the upper region of the end wall 2 so that the material arrives in the annular chamber 17 in accordance with the arrow 16.

Dressing the material lies in the pre-sorting for example and crushing of the refuse obtained as well as in mixing the refuse with liquid effluent materials, such as sewage sediment until a predetermined moisture content is set; which can be 65%. Dressing or pretreatment can also consist in adding further additional materials, such as drying agents, carbon fillers or materials having an effect on the pH value to the mixture.

In the example shown a further crushing and homogenisation of the material introduced takes place at the charging end of the annular chamber 17 of the device. Known crushing devices can be provided for this. The material is subjected to filtering before this crushed material moves on in the direction of the arrow 20 through the annular chamber. A filter 18 crossing the annular chamber is provided for this purpose and as shown is arranged advantageously at an angle to the axis 6, i.e. like a swashplate. Thus a large effect is made on the material supplied which can be conveyed substantially by arranging a movable filling of solid bodies 19, such as stones or steel balls between the screen 18 and the front wall 2, the dimensions of these solid bodies being larger than the size of the screen orifices. Owing to this swashplate effect of the screen 18 and the movable filling of solid bodies there is a sufficient crushing action on the charge material which is being dressed, whereby the screening action ensures that material which has been homogenised to a large extent is subjected to a quick decay process.

During movement through the annular chamber 17 in the direction of the arrow 20, the decay material is supervised with regard to the atmosphere so that the decay process takes place optimally. Supervision can take place by supplying fresh air or removing the gases which have arisen or by supplying gases such as oxygen or nitrogen. For this purpose appropriate controllable openings on the fixed front discs 2 and 3 which are in connection with the annular chamber 17 can be provided one of these being indicated by the connecting piece 37 on the front disc 3. The heat arising during decay is maintained since the sleeve as already mentioned has sufficient heat insulation from the outside as is indicated at 50.

If the material has passed substantialy through the annular chamber 17 then it reaches a screen surface 21 at the end remote from the charge end, said surface 21 forming a continuation of the inner cylinder 5 and being broadened out, in the example shown, towards the front disc 3 in a truncated cone shape whereby the annular chamber 17 is reduced in cross-section accordingly. The screen surface 21 forms a direct connection between the annular chamber 17 and the inner chamber 29 through which the quick decay material can reach the inner chamber from the annular chamber as shown by the arrow 22. The screen size is selected so that, by means of rapid decay, the material can arrive in the inner chamber 29 in an appropriately pliable and crushed state substantially unhindered. The screen does however, at the same time do not prevent these components, which cannot be subjected to decay, i.e. mainly solid bodies made of plastics, from moving radially in an outward direction on the surface 21, whereby this travel is supported by conveyor elements, such as a spiral 30 which is arranged on the screen element 21. The solid bodies which are not capable of decay thus reach an outlet connection 31 lying above at the end of the annular chamber 17 through which the components which cannot decay pass to the outside.

The material which can decay on the other hand passes through the screen surface 21 into the inner chamber 29 and reaches an impermeable shell 34 which protects the transition region between the two chambers at least at the bottom, i.e. the lower half of the annular chamber 17. The material collecting on the guide channel 34 constructed like a cylinder shell, which channel can be fixed to the front plate 3, is set in motion by means of a conveyor device, for example the screw conveyor 32, 35, cooperating with this channel 34 in the direction of the arrow 23 in the opposite direction to the travelling direction 20 of the annular chamber. The screw conveyor 32, 35 or other conveyor elements cooperating with the channel 34 are fixed to the inner cylinder 5 by the spider 33, for example, and rotate with it whereby the desired conveyor action is achieved. The material is subjected to subsequent decay in the inner chamber 29 during its travel in the direction of the arrow 23. Separate ventilation or other supervision of the atmosphere of the inner chamber 29 is advisable and necessary for this. Appropriate access ports can be provided from outside as is indicated at 36 in the front plate 3. Although the build up of heat is noticeably less during subsequent decay than during rapid decay, the material remains at a high temperatue since it is kept at a uniform temperature in the annular chamber 17 by the sleeve of the material.

When passing through the two chambers the original moisture is reduced from 65% for example to a moisture content of approximately 30% at the output of the inner chamber 29, whereby a certain subsequent drying of the material takes place in effect in the inner chamber 29. An extraction funnel 24 is provided at the extraction end of the inner chamber 29 through which the decayed material passes outside in accordance with the arrow 25. A conveyor channel projects into the inner chamber 29 from the front wall 2 in which a conveyor device connected to the inner cylinder, such as screw conveyor 39, operates the said conveyor being supported on the inner cylinder 5 via the spider 38. The screw conveyor conveys the incoming material in forced manner out of the inner chamber 29 into the extraction funnel 24.

In many cases, it has proved to be advisable if a part of the completely decayed material is supplied to the fresh material at the extraction end of the annular chamber 17 whereby the decay can be substantially homogenised and accelerated.

With the device shown, settable recycling of the completely decayed material is possible in the charging chamber of the annular chamber. For this purpose the discharging end of the inner cylinder 5 comprises a screen sleeve 42 in which the conveyor channel is provided with a small spacing. The conveyor channel comprises two partially cylindrical shells 40, 41 which are arranged concentrically and can be displaced relative to each other about the axis of rotation as is indicated in FIG. 2. Thus a clearance 43 of variable circumferential size can be set on the side of the conveyor channel which points downwards and the decayed material from the inner chamber 29 can arrive in the charging region of the annular chamber 17 through this clearance 43 via the exposed screen surface 42.

Obviously it is possible to provide openings in the sleeve of the cylinder distributed over the length of the inner cylinder 5, predetermined amounts of the decayed material being able to enter the annular chamber 17 through these openings at various points along the length of the annular chamber 17. Experience has proved however that recycling at the charging end is sufficient and is particularly advantageous more particularly because exact setting of the proportion recycled is possible at the charging end.

What we claim is:

1. Apparatus for the biological composting of waste material comprising a first thermally insulated hollow cylinder mounted for rotation about its longitudinal axis; a second hollow cylinder mounted within said first cylinder for for conjoint rotation therewith; means for closing the ends of said first and second cylinders to define a first annular chamber therebetween and a second chamber within said second cylinder, inlet means communicating with said annular chamber adjacent one axial end thereof for the introduction into said annular chamber of materials to be composted, means adjacent the other axial end of said annular chamber for the transferring material from said annular chamber to said second chamber within said second cylinder; discharge means communicating with the chamber within said second cylinders, whereby said waste material is moved in a path through said annular chamber from said one axial end to said other axial end thereof and countercurrently through the interior of said second cyliner, the heat generated during biological decay of the material during its movement in said annual chamber being employed to heat the material in said second chamber.

2. The apparatus according to claim 1, wherein said means for transferring said material from said annular chamber to said second chamber comprises at least a portion of said second cylinder adjacent to the other axial end of said annular chamber being formed as a sieve permitting movement of a selected portion of said material therethrough.

3. The apparatus according to claim 2, wherein the sieve extends conically outward in the direction of the end wall at the other end wall of the adjacent axial end.

4. The apparatus according to claim 2, including means for conveying said material from said sieve through the chamber of said second cylinder, said conveying means being conjointly rotatable with said second cylinder to move said material therethrough in a direction opposite to the direction of travel of the material in said annular chamber.

5. The apparatus according to claim 1 or 2, wherein the diameter of the second cylinder is not more than half the diameter of the first cylinder.

6. The apparatus according to claim 1 or 2, wherein said means for transferring said material from said annular chamber to said second chamber includes a semi-circular conveyor channel extending from said other end wall axially into said second cylinder, said channel having a radius approximately corresponding to the radius of curvature of said second cylinder to ensure transfer of material therein.

7. The apparatus according to claim 1 or 2, wherein said cylinders are open at each of their ends and the means for closing said cylinder comprise stationary end walls through which said waste is introduced and discharged, and including means for sealing said end walls and said cylinders against the escape of effluent waste.

8. The apparatus according to claim 7, wherein the conveying elements comprise a screw conveyor.

9. The apparatus according to claim 1 including means rotatable with said second cylinder and arranged about the exterior of said sieve for raising material which has not decayed from said annular chamber to an outlet arranged in the end wall adjacent thereto.

10. The apparatus according to claim 1, including longitudinally extending partition walls projecting generally radially inwardly from said first cylinder and generally radially outwardly from said second cylinder wherein the annular chamber is subdivided into several chamber sections.

11. The apparatus according to claim 1, including means for ventilating the said annular chamber and the second cylinder.

12. The apparatus according to claim 1 wherein said discharge means comprises a cylindrical section extending through said second cylinder and communicating with an opening in the stationary end wall at the waste discharge end and a conveyor on said cylindrical section to move said material through said opening.

13. The apparatus to claim 12 wherein the conveyor element comprise a screw conveyor.

14. The apparatus according to claim 12, wherein said second cylinder surrounding said cylindrical section of said discharge means is perforated and includes valve means communicating with said annular chamber, whereby a portion of the decayed material from the the second cylinder can be transferred into said annular chamber.

15. The apparatus according to claim 14, wherein the cylindrical section of said discharge means is a pair of relatively slidable shell elements forming said valve means.

16. The apparatus according to claim 1, including means for crushing the waste material, said crushing means being located in the annular chamber adjacent the inlet.

17. The apparatus according to claim 1, including a screen wall secured to said inner and outer cylinders between the ends thereof to divide the annular chamber into two axial sections.

18. The apparatus according to claim 17, wherein said screen wall is arranged at an angle to the axis of rotation of said cylinders to form a swashplate.

19. The apparatus according to claim 18, wherein said crushing means comprises a plurality of particulate matter having dimensions extending the hole size of said screen wall, said particulate matter being in the annular chamber adjacent the inlet.

* * * * *